(12) United States Patent
Minks-Brown et al.

(10) Patent No.: US 9,323,441 B1
(45) Date of Patent: Apr. 26, 2016

(54) DISPLAY OF COMMERCIAL ICONS ON A WIRELESS COMMUNICATION DEVICE

(71) Applicant: Sprint Communications Company L.P., Overland Park, KS (US)

(72) Inventors: Christa Lynne Minks-Brown, Olathe, KS (US); Jason W. Rincker, Overland Park, KS (US); Jessica Sue Meurer, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 544 days.

(21) Appl. No.: 13/767,258

(22) Filed: Feb. 14, 2013

(51) Int. Cl.
*G06F 3/048* (2013.01)
*G06F 3/0485* (2013.01)

(52) U.S. Cl.
CPC .................... *G06F 3/0485* (2013.01)

(58) Field of Classification Search
CPC .............................. G06F 3/0481; G06F 3/0482
USPC .................................................. 715/784, 810
See application file for complete search history.

(56) References Cited

U.S. PATENT DOCUMENTS

| | | | |
|---|---|---|---|
| 6,237,145 B1 * | 5/2001 | Narasimhan | G06Q 20/045 705/14.27 |
| 7,920,849 B2 | 4/2011 | Pop | |
| 8,036,934 B2 | 10/2011 | Mankoff | |
| 8,046,257 B2 | 10/2011 | Wane et al. | |
| 8,140,386 B2 | 3/2012 | Mankoff | |
| 2004/0073497 A1 | 4/2004 | Hayes et al. | |
| 2005/0228719 A1 | 10/2005 | Roberts et al. | |
| 2006/0194569 A1 | 8/2006 | Hsueh | |
| 2007/0150339 A1 | 6/2007 | Retter et al. | |
| 2007/0241189 A1 | 10/2007 | Slavin et al. | |
| 2007/0266411 A1 * | 11/2007 | Yamamoto | A63F 13/10 725/88 |
| 2009/0288012 A1 | 11/2009 | Hertel et al. | |
| 2010/0114731 A1 | 5/2010 | Kingston et al. | |
| 2011/0087529 A1 | 4/2011 | Angell | |
| 2011/0145049 A1 | 6/2011 | Hertel et al. | |
| 2012/0131504 A1 * | 5/2012 | Fadell | F24F 11/0086 715/810 |
| 2014/0136946 A1 * | 5/2014 | Matas | G06F 3/0488 715/234 |

* cited by examiner

*Primary Examiner* — Haoshian Shih

(57) ABSTRACT

A wireless communication device receives data indicating commercial icons that are related to commercial industries and displays an original group of the commercial icons that are individually related to different ones of the commercial industries. The wireless communication device receives a first user input to scroll the display toward a first set of the commercial icons related to a first one of the commercial industries, and in response, display the first set of the commercial icons related to the first one of the commercial industries while displaying a portion of the original group of the commercial icons that are not related to the first one of the commercial industries. A second user input is received to scroll the display toward a second set of the commercial icons related to a second one of the commercial industries based on the displayed portion of the original group of the commercial icons.

20 Claims, 5 Drawing Sheets

DISPLAY OF COMMERCIAL ICONS ON A WIRELESS COMMUNICATION DEVICE

TECHNICAL BACKGROUND

Modern wireless communication devices, such as smartphones or tablets, typically include a touchscreen that acts as both a display and input mechanism for the user. These wireless communication devices enable a user to perform several functions beyond simple mobile voice communication. For example, a user may download, install, and execute third-party applications, access websites, stream media, conduct online shopping, and perform other advanced functionality of which the smartphone is capable.

Some wireless communication devices may include a wallet application that executes on the device and enables users to purchase goods and services directly from the wireless communication device. For the convenience of the user to quickly make purchases without having to enter payment information, the wallet application typically either securely stores credit cards or other payment information associated with the user, or charges purchases to the user's monthly wireless service bill. The wallet application may present to the user a number of commercial entities providing various goods and services, promotions, advertisements, and other offers that may be of interest to the user. In some examples, the wallet application may have a large number of commercial entities related to various commercial industries that are too numerous to all be displayed on the screen of the wireless communication device simultaneously. In such cases, the user must often scroll through several different pages or views of all the commercial entities appearing in a vast landscape of the wallet application.

OVERVIEW

A method of operating a wireless communication device is disclosed. The method comprises receiving data indicating a plurality of commercial icons that are related to a plurality of commercial industries. The method further comprises, on a display of the wireless communication device, displaying an original group of the commercial icons that are individually related to different ones of the commercial industries. The method further comprises receiving a first user input to scroll the display toward a first set of the commercial icons related to a first one of the commercial industries, and in response, displaying the first set of the commercial icons related to the first one of the commercial industries while displaying a portion of the original group of the commercial icons that are not related to the first one of the commercial industries. The method further comprises receiving a second user input to scroll the display toward a second set of the commercial icons related to a second one of the commercial industries based on the displayed portion of the original group of the commercial icons, and in response, displaying the second set of the commercial icons related to the second one of the commercial industries while displaying another portion of the original group of the commercial icons that are not related to the second one of the commercial industries.

A wireless communication device comprises a graphical user interface comprising a display, a wireless communication transceiver, and a processing system. The wireless communication transceiver is configured to receive data indicating a plurality of commercial icons that are related to a plurality of commercial industries. The processing system is configured to direct the graphical user interface to display an original group of the commercial icons that are individually related to different ones of the commercial industries. The processing system is configured to direct the graphical user interface to receive a first user input to scroll the display toward a first set of the commercial icons related to a first one of the commercial industries, and in response, display the first set of the commercial icons related to the first one of the commercial industries while displaying a portion of the original group of the commercial icons that are not related to the first one of the commercial industries. The processing system is configured to direct the graphical user interface to receive a second user input to scroll the display toward a second set of the commercial icons related to a second one of the commercial industries based on the displayed portion of the original group of the commercial icons, and in response, display the second set of the commercial icons related to the second one of the commercial industries while displaying another portion of the original group of the commercial icons that are not related to the second one of the commercial industries.

A computer apparatus comprises software instructions and at least one non-transitory computer-readable storage medium storing the software instructions. The software instructions are configured, when executed by a wireless communication device, to direct the wireless communication device to receive data indicating a plurality of commercial icons that are related to a plurality of commercial industries, display an original group of the commercial icons on a display of the wireless communication device that are individually related to different ones of the commercial industries, receive a first user input to scroll the display toward a first set of the commercial icons related to a first one of the commercial industries, and in response, display the first set of the commercial icons related to the first one of the commercial industries while displaying a portion of the original group of the commercial icons that are not related to the first one of the commercial industries, and receive a second user input to scroll the display toward a second set of the commercial icons related to a second one of the commercial industries based on the displayed portion of the original group of the commercial icons, and in response, display the second set of the commercial icons related to the second one of the commercial industries while displaying another portion of the original group of the commercial icons that are not related to the second one of the commercial industries.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
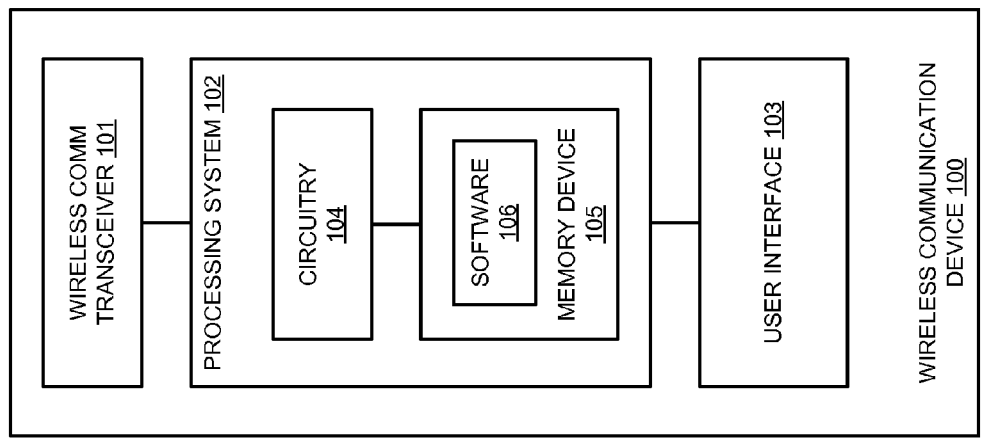
FIG. 1 is a block diagram that illustrates a wireless communication device.

FIG. 1 is a block diagram that illustrates wireless communication device 100. Wireless communication device 100 includes wireless communication transceiver 101, processing system 102, and user interface 103. Processing system 102 is linked to wireless communication transceiver 101 and user interface 103. Processing system 102 includes processing circuitry 104 and memory device 105 that stores operating software 106.

Figure 2:
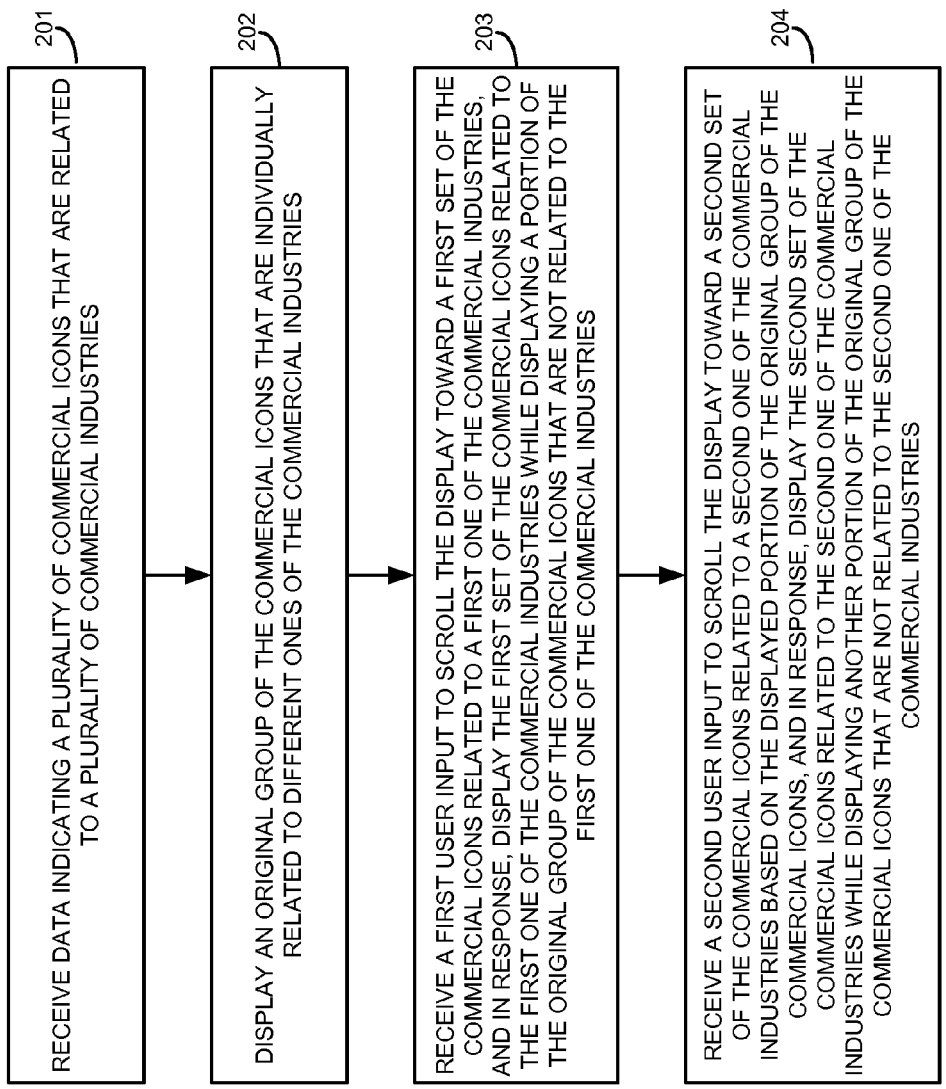
FIG. 2 is a flow diagram that illustrates an operation of the wireless communication device.

FIG. 2 is a flow diagram that illustrates an operation of wireless communication device 100. The steps of the operation are indicated below parenthetically. The operation of wireless communication device 100 shown in FIG. 2 may typically be employed by an operating system of wireless communication device 100, but could also be performed by an application, script, or any other executable code contained in software and/or embedded in hardware. For example, the operation of wireless communication device 100 shown in FIG. 2 may be performed by a wallet application of wireless communication device 100.

To begin, wireless communication device 100 receives data indicating a plurality of commercial icons that are related to a plurality of commercial industries (201). For example, the commercial icons could represent different stores, companies, advertisements, offers, coupons, and any other commercial item. The commercial icons are related to various commercial industries, such as food service, media service, apparel, entertainment, electronics, home appliances, housewares, sports, financial, and any other type of commercial industry.

Wireless communication device 100 displays an original group of the commercial icons that are individually related to different ones of the commercial industries (202). The original group of the commercial icons could be selected for display by wireless communication device 100 based on various criteria. For example, wireless communication device 100 could display a random selection of the commercial icons in the original group, select the commercial icons that are most frequently accessed by the user or the "favorite" icons of the user based on historical usage or purchase history, a user-selected group of icons previously indicated by the user, sponsored advertisements that the entities associated with the commercial icons have paid a fee for prominent placement in the original group of icons, and any other basis for selecting the commercial icons—including combinations thereof. The original group of the commercial icons that are displayed by wireless communication device 100 are individually related to different ones of the commercial industries, such that several different types or categories of the commercial industries are represented by the commercial icons in the original group. In some examples, wireless communication device 100 may oscillate a size of at least one of the commercial icons in the original group when displaying the original group of the commercial icons. For example, wireless communication device 101 may oscillate a size of one of the commercial icons in order to draw the user's attention by enlarging the icon to a larger size relative to the other icons, repeatedly increasing and decreasing the size of the icon, rotating the icon, or any other modification to the size of the icon. In some examples, wireless communication device 100 oscillates the size of a commercial icon associated with a sponsored advertisement, or may enlarge the size of a commercial icon when the user touches the icon with a finger.

Wireless communication device 100 receives a first user input to scroll the display toward a first set of the commercial icons related to a first one of the commercial industries, and in response, displays the first set of the commercial icons related to the first one of the commercial industries while displaying a portion of the original group of the commercial icons that are not related to the first one of the commercial industries (203). The first user input to scroll the display toward the first set of the commercial icons would typically be provided by the user sliding a finger over a touchscreen of wireless communication device 100, but the user may provide the first user input using a stylus, mouse, voice command, or any other user input technique. The first set of the commercial icons are related to a first one of the commercial industries such that all of the commercial icons of the first set are of the same type or category of commercial industry. For example, the first set of the commercial icons could comprise a number of different restaurants that are related to a food service commercial industry. In response to the first user input, wireless communication device 100 displays the first set of the commercial icons while also displaying a portion of the original group of the commercial icons that are not related to the first one of the commercial industries. Continuing the example above, if the first set of the commercial icons are related to the food service industry, then the portion of the original group of the commercial icons that are not related to the first one of the commercial industries could include icons related to a media service, apparel, electronics, entertainment, home appliance, housewares, sports, financial, and any other type of commercial industry. For example, when the user scrolls the display toward the first set of the commercial icons related to the first one of the commercial industries, the entire display will not be filled by only those commercial icons in the first set that are related to the same type of commercial industry, but will still display other commercial icons related to different commercial industries other than the commercial industry of the first set of the commercial icons. In some examples, wireless communication device 100 may oscillate a size of at least one of the commercial icons in the first set when displaying the first set of the commercial icons.

Wireless communication device 100 receives a second user input to scroll the display toward a second set of the commercial icons related to a second one of the commercial industries based on the displayed portion of the original group of the commercial icons, and in response, displays the second set of the commercial icons related to the second one of the commercial industries while displaying another portion of the original group of the commercial icons that are not related to the second one of the commercial industries (204). Typically, the second set of the commercial icons related to the second one of the commercial industries is selected by the second user input from among the portion of the original group of the commercial icons that are displayed in response to the first user input and are not related to the first one of the commercial industries. For example, if the first set of the commercial icons are related to a food service industry, the second set of the commercial icons could be related to a second one of the commercial industries, such as a media service. In response to the second user input, wireless communication device 100 displays the second set of the commercial icons related to the second one of the commercial industries, while also displaying another portion of the original group of the commercial icons that are not related to the second one of the commercial industries. For example, if the second set of the commercial icons are related to the media service industry, then another portion of the original group of the commercial icons that are not related to the second one of the commercial industries could include icons related to a food service, apparel, electronics, entertainment, home appliance, housewares, sports, financial, or any other type of commercial industry. In some examples, wireless communication device 100 may oscillate a size of at least one of the commercial icons in the second set when displaying the second set of the commercial icons.

Advantageously, in response to a user input to scroll the display toward a set of commercial icons related to a particular commercial industry, wireless communication device 100 displays the first set of commercial icons related to that particular industry, while also continuing to display a portion of the original group of commercial icons that are not related to that industry. Accordingly, the user is still able to view and select from other commercial icons that are not related to the particular commercial industry towards which the user scrolled the display. In this manner, the user can still scroll toward one of the other commercial icons that are associated with one of the different commercial industries other than the industry scrolled toward by the previous user input, thereby facilitating the selection of a different commercial icon related to one of the different commercial industries.

Referring back to FIG. 1, wireless communication device 100 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 100 may also include a user interface, memory system, software, processing circuitry, or some other communication components. For example, wireless communication device 100 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 100 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 100 and a wireless communication network.

In this example, wireless communication device 100 includes wireless communication transceiver 101, processing system 102, and user interface 103. Processing system 102 is linked to wireless communication transceiver 101 and user interface 103. Processing system 102 includes processing circuitry 104 and memory device 105 that stores operating software 106. Wireless communication device 100 may include other well-known components such as a battery and enclosure that are not shown for clarity. Wireless communication device 100 may comprise a telephone, computer, e-book, mobile Internet appliance, media player, game console, wireless network interface card, or some other wireless communication apparatus—including combinations thereof.

Wireless communication transceiver 101 comprises RF communication circuitry and an antenna. The RF communication circuitry typically includes an amplifier, filter, RF modulator, and signal processing circuitry. Wireless communication transceiver 101 may also include a memory system, software, processing circuitry, or some other communication device. Wireless communication transceiver 101 may use various protocols, such as CDMA, GSM, UMTS, HSPA, EV-DO, EV-DO rev. A, 3GPP LTE, LTE Advanced, WiMAX, Wi-Fi, Bluetooth, Internet, telephony, or some other wireless communication format.

User interface 103 comprises components that interact with a user to receive user inputs and to present media and/or information. In some examples, user interface 103 may also include a speaker, microphone, buttons, lights, touchscreen, touch pad, scroll wheel, communication port, or some other user input/output apparatus—including combinations thereof.

Processing circuitry 104 comprises microprocessor and other circuitry that retrieves and executes operating software 106 from memory device 105. Processing circuitry 104 may comprise a single device or could be distributed across multiple devices—including devices in different geographic areas. Processing circuitry 104 may be embedded in various types of equipment. Memory device 105 comprises a non-transitory computer readable storage medium, such as a disk drive, flash drive, data storage circuitry, or some other hardware memory apparatus. Memory device 105 may comprise a single device or could be distributed across multiple devices—including devices in different geographic areas. Memory device 105 may be embedded in various types of equipment. Processing circuitry 104 is typically mounted on a circuit board that may also hold memory device 105 and portions of wireless communication transceiver 101 and user interface 103. Operating software 106 comprises computer programs, firmware, or some other form of machine-readable processing instructions. Operating software 106 may include an operating system, utilities, drivers, network interfaces, applications, or some other type of software. When executed by processing circuitry 104, operating software 106 directs processing system 102 to operate wireless communication device 100 as described herein.

Figure 3:
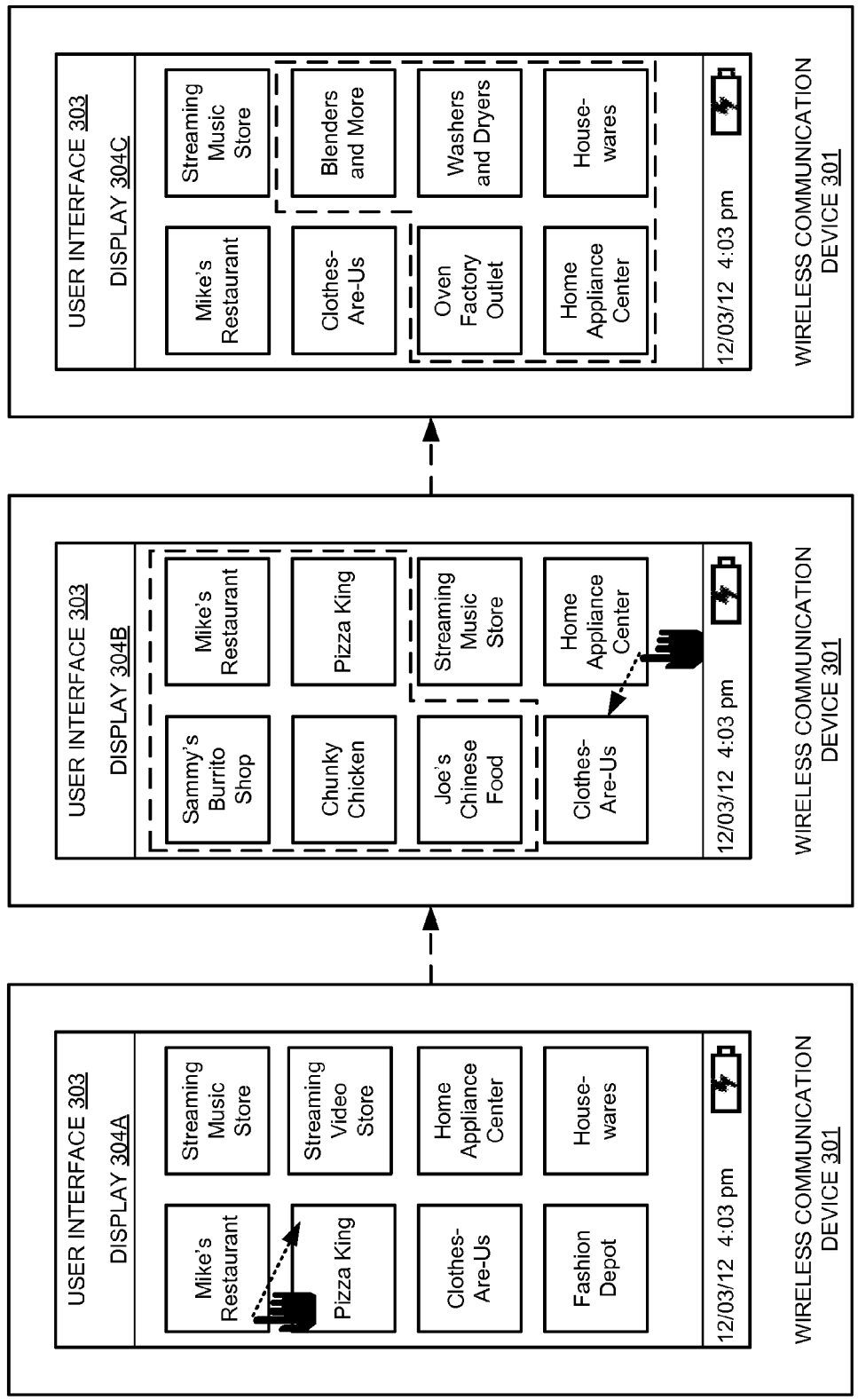
FIG. 3 is a block diagram that illustrates an operation of a wireless communication device in an exemplary embodiment.

FIG. 3 is a block diagram that illustrates an operation of wireless communication device 301 in an exemplary embodiment. Wireless communication device 301 includes user interface 303. As shown in FIG. 3, user interface 303 includes a touchscreen having three different display states labeled display 304A, 304B, and 304C, respectively. Each display 304A, 304B, and 304C are different states of the display on the touchscreen of user interface 303 at different times, with display 304A being earlier in time than display 304B and 304C, display 304B occurring after display 304A, and lastly display 304C occurring later in time than display 304B.

The hand icon with the pointing finger appearing on displays 304A and 304B represents the hand of the user operating wireless communication device 301 and is not actually part of respective displays 304A and 304B. The directional arrow adjacent to the hand icon indicates the direction in which the user is sliding a finger on a touchscreen of user interface 303 in order to scroll the display in the opposite direction of the arrow. In this example, the user is initially presented with a plurality of commercial icons on display 304A, where each of the commercial icons belong to different types or categories of commercial industries. In the original group of commercial icons appearing on display 304A, "Mike's Restaurant" and "Pizza King" are related to a food service industry, "Streaming Music Store" and "Streaming Video Store" are related to a media service industry, "Clothes-Are-Us" and "Fashion Depot" are related to an apparel industry, and "Home Appliance Center" and "Housewares" are related to a home commodities industry.

As shown on display 304A, the directional arrow adjacent to the hand icon indicates that the user is providing a user input on a touchscreen to scroll the display towards the "Mike's Restaurant" and "Pizza King" icons, which are related to the food services industry.

In response to the user input to scroll the display towards the icons related to food service, wireless communication device 301 presents additional commercial icons related to the food service industry as shown in display 304B. The commercial icons related to the food service industry that the user has scrolled the display towards are highlighted by the dashed line shown on display 304B that surrounds all of the food service icons being displayed, but note that this dashed line would not typically be displayed by wireless communication device 301 but is shown on display 304B for clarity. In this example, although the user has scrolled the display towards the icons related to food service, instead of filling the entire display with commercial icons related to the food service industry, wireless communication device 301 still shows commercial icons that were appearing in the original group of icons on display 304A that are related to commercial industries other than food service. Wireless communication device 301 displays the non-food service-related icons on the edges of display 304B, where "Streaming Music Store" of the media service industry, "Home Appliance Center" of the home commodities industry, and "Clothes-Are-Us" of the apparel industry are still visible as shown on the bottom of display 304B. Wireless communication device 301 leaves these "anchor" icons on the edges of display 304B in order to provide the user with a quick means to access additional commercial icons related to one of these other commercial industries. Without these anchored icons related to commercial industries other than food service, the user might scroll too far into the icons related to the food services industry to a point where only icons related to food service are being displayed, and then would not be able to easily access commercial icons related to other industries without scrolling all the way back through the icons related to food service.

As shown by the hand icon and adjacent arrow on display 304B, the user provides another user input to scroll the display towards the "Home Appliance Center" commercial icon which is related to the home commodities industry.

In response to the second user input to scroll the display towards the icons related to home commodities, wireless communication device 301 presents additional commercial icons related to the home commodities industry as shown in display 304C, namely "Blenders and More", "Oven Factory Outlet", "Washers and Dryers", "Home Appliance Center", and "Housewares". The commercial icons related to the home commodities industry that the user has scrolled the display towards are highlighted by the dashed line shown on display 304C that surrounds all of the home commodities icons being displayed. In this example, although the user has scrolled the display towards the icons related to home commodities, instead of filling the entire display with commercial icons related to the home commodities industry, wireless communication device 301 maintains at least one commercial icon from each commercial industry other than home commodities on display 304C that were appearing in the original group of icons on display 304A. Wireless communication device 301 anchors the icons that are not related to the home commodities industry on the edges of display 304C, where "Mike's Restaurant" of the food service industry, "Streaming Music Store" of the media service industry, and "Clothes-Are-Us" of the apparel industry are still visible as shown on the top of display 304C. As discussed above, wireless communication device 301 leaves these commercial icons anchored to the edge of display 304C in order to provide the user with a quick means to access additional commercial icons related to one of these other commercial industries. In this manner, the user cannot venture "too far" into the icons related to the home commodities industry without losing sight of at least one icon related to each of the other commercial industries appearing in the original group of icons on display 304A, thereby enabling the user to quickly scroll into a set of icons related to one of these other commercial industries if the user so desires. Advantageously, this operation of wireless communication device 301 facilitates the user in navigating through the commercial icons displayed by device 301.

Figure 4:
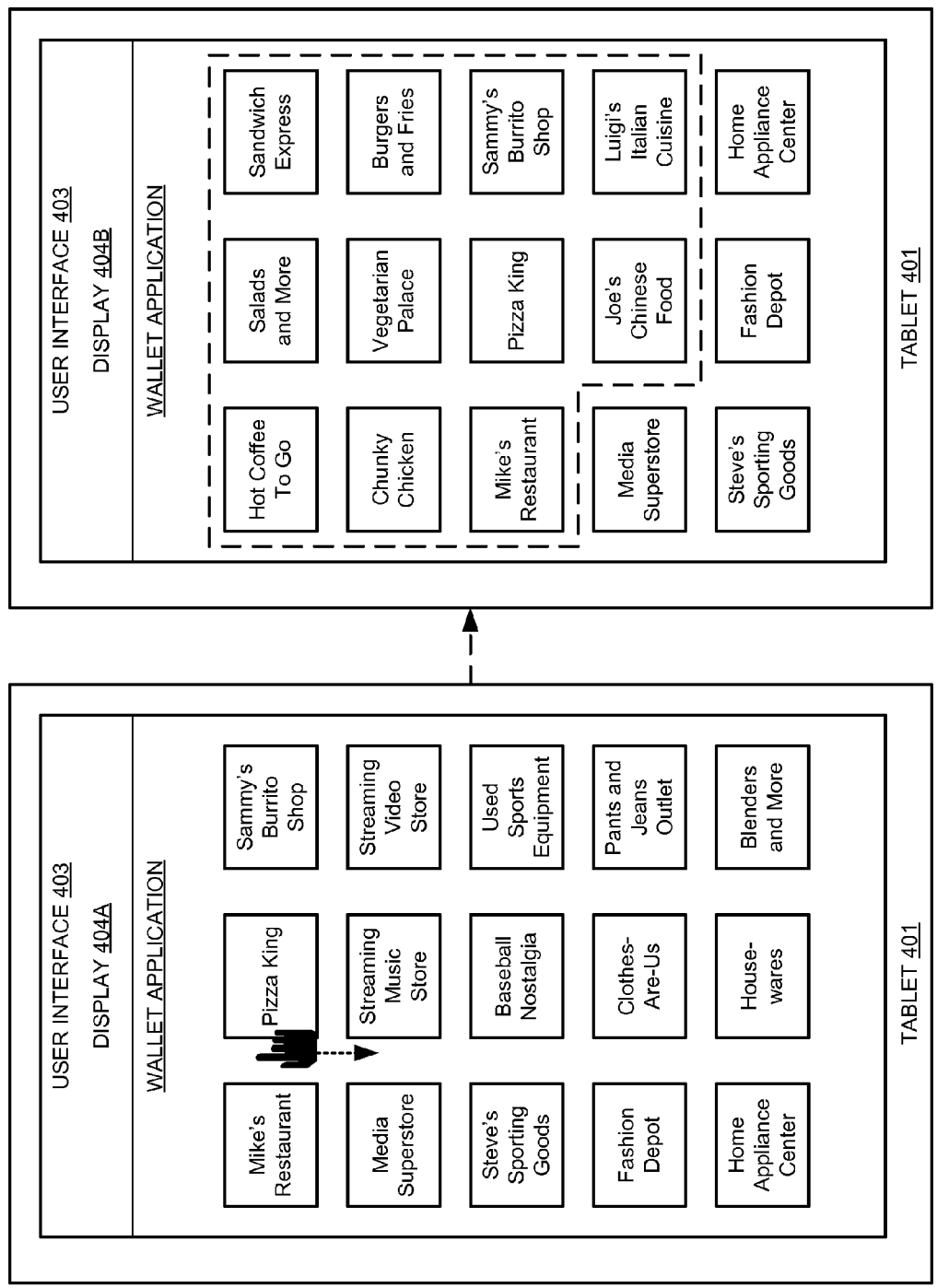
FIG. 4 is a block diagram that illustrates an operation of a tablet in an exemplary embodiment.

FIG. 4 is a block diagram that illustrates an operation of tablet 401 in an exemplary embodiment. Tablet 401 provides an example of wireless communication device 100, although device 100 could use alternative configurations. Wireless communication device 401 includes user interface 403. As shown in FIG. 4, user interface 403 includes a touchscreen having two different display states labeled display 404A and 404B. Each display 404A and 404B are different states of the display on the touchscreen of user interface 403 at different times, with display 404A being earlier in time than display 404B.

The hand icon with the pointing finger appearing on display 404A represents the hand of the user operating tablet 401 and is not actually part of display 404A. The directional arrow adjacent to the hand icon indicates the direction in which the user is sliding a finger on a touchscreen of user interface 403 in order to scroll the display in the opposite direction of the arrow. In this example, the user has accessed a wallet application on tablet 401. The wallet application represents a virtual wallet of the user of tablet 401 that could contain various promotions, advertisements, and business cards of commercial entities that the user might keep in a physical, real-world wallet. In this example, the user is initially presented with a plurality of commercial icons on display 404A, where each of the commercial icons belong to different types or categories of commercial industries. In the original group of commercial icons appearing on display 404A, "Mike's Restaurant", "Pizza King", and "Sammy's Burrito Shop" are related to a food service industry, "Media Superstore", "Streaming Music Store" and "Streaming Video Store" are related to a media service industry, "Steve's Sporting Goods", "Baseball Nostalgia", and "Used Sports Equipment" are related to a sports industry, "Fashion Depot", Clothes-Are-Us" and "Pants and Jeans Outlet" are related to an apparel industry, and "Home Appliance Center", "Housewares", and "Blenders and More" are related to a home commodities industry.

As shown on display 404A, the directional arrow adjacent to the hand icon indicates that the user is providing a user input on a touchscreen to scroll the display towards the "Mike's Restaurant" and "Pizza King" icons, which are related to the food services industry.

In response to the user input to scroll the display towards the icons related to food service, the wallet application executing on tablet 401 presents additional commercial icons related to the food service industry as shown in display 404B. The commercial icons related to the food service industry that the user has scrolled the display towards are highlighted by the dashed line shown on display 404B that surrounds all of the food service icons being displayed. In this example, although the user has scrolled the display towards the icons related to food service, instead of filling the entire display with commercial icons related to the food service industry, the wallet application still anchors commercial icons that were appearing in the original group of icons on display 404A that are related to commercial industries other than food service. The wallet application anchors the icons that are not related to food service on the edges of display 404B, where "Media Superstore" of the media service industry, "Steve's Sporting Goods" of the sports industry, "Fashion Depot" of the apparel industry, and "Home Appliance Center" of the home commodities industry are still visible as shown on the bottom of display 404B. The wallet application running on tablet 401 leaves these commercial icons anchored to the edge of display 404B in order to provide the user with quick access to additional commercial icons related to one of these other commercial industries. Without these anchored icons related to commercial industries other than food service, the user might keep scrolling deep into the group of icons related to the food services industry to a point where only icons related to food service are being displayed, and then would not be able to easily access commercial icons related to other industries without scrolling all the way back through the icons related to food service. This operation of the wallet application executing on tablet 401 thereby facilitates the navigation and selection of icons related to various commercial industries.

Figure 5:
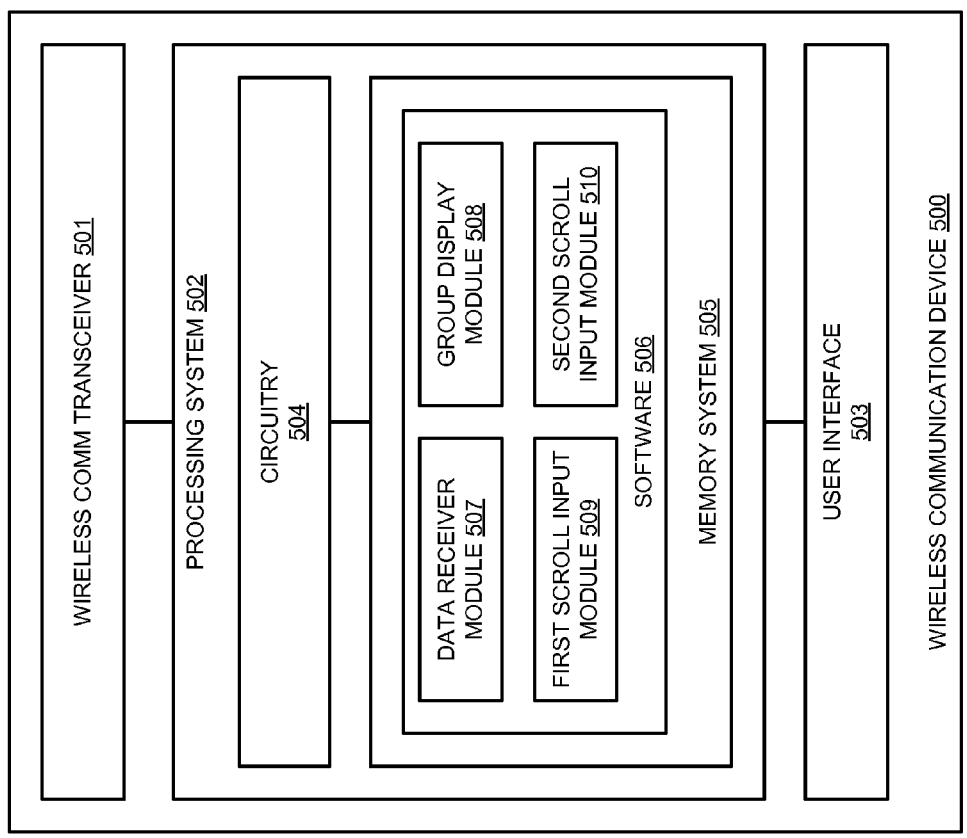
FIG. 5 is a block diagram that illustrates a wireless communication device.

FIG. 5 is a block diagram that illustrates wireless communication device 500. Wireless communication device 500 provides an example of wireless communication devices 100 and 301 and tablet 401, although devices 100 and 301 and tablet 401 could use alternative configurations. Wireless communication device 500 comprises wireless communication transceiver 501, processing system 502, and user interface 503. Processing system 502 is linked to wireless communication transceiver 501 and user interface 503. Processing system 502 includes processing circuitry 504 and memory system 505 that stores operating software 506. Operating software 506 comprises software modules 507-510. Wireless communication device 500 may include other well-known components such as a battery and enclosure that are not shown for clarity. Wireless communication device 500 may comprise a telephone, computer, e-book, mobile Internet appliance, media player, game console, wireless network interface card, or some other wireless communication apparatus—including combinations thereof.

Wireless communication transceiver 501 comprises RF communication circuitry and an antenna. The RF communication circuitry typically includes an amplifier, filter, RF modulator, and signal processing circuitry. Wireless communication transceiver 501 may also include a memory system, software, processing circuitry, or some other communication device. Wireless communication transceiver 501 may use various protocols, such as CDMA, GSM, UMTS, HSPA, EV-DO, EV-DO rev. A, 3GPP LTE, LTE Advanced, WiMAX, Wi-Fi, Bluetooth, Internet, telephony, or some other wireless communication format. Wireless communication transceiver 501 may be configured to receive data indicating a plurality of commercial icons that are related to a plurality of commercial industries.

User interface 503 comprises components that interact with a user to receive user inputs and to present media and/or information. User interface 503 may include a speaker, microphone, buttons, lights, display screen, touchscreen, touch pad, scroll wheel, communication port, or some other user input/output apparatus—including combinations thereof. User interface 503 may be configured to display an original group of commercial icons that are individually related to different ones of commercial industries. User interface 503 may be further configured to receive a first user input to scroll the display toward a first set of the commercial icons related to a first one of the commercial industries, and in response, display the first set of the commercial icons related to the first one of the commercial industries while displaying a portion of the original group of the commercial icons that are not related to the first one of the commercial industries. User interface 503 may be further configured to receive a second user input to scroll the display toward a second set of the commercial icons related to a second one of the commercial industries based on the displayed portion of the original group of the commercial icons, and in response, display the second set of the commercial icons related to the second one of the commercial industries while displaying another portion of the original group of the commercial icons that are not related to the second one of the commercial industries.

Processing circuitry 504 comprises microprocessor and other circuitry that retrieves and executes operating software 506 from memory system 505. Processing circuitry 504 may comprise a single device or could be distributed across multiple devices—including devices in different geographic areas. Processing circuitry 504 may be embedded in various types of equipment. Processing circuitry 504 is typically mounted on a circuit board that may also hold memory system 505 and portions of wireless communication transceiver 501 and user interface 503. Memory system 505 comprises a non-transitory computer readable storage medium, such as a disk drive, flash drive, data storage circuitry, or some other hardware memory apparatus. Memory system 505 may comprise a single device or could be distributed across multiple devices—including devices in different geographic areas. Memory system 505 may be embedded in various types of equipment. In some examples, a computer apparatus could comprise memory system 505 and operating software 506. Operating software 506 comprises computer programs, firmware, or some other form of machine-readable processing instructions. Operating software 506 may include an operating system, utilities, drivers, network interfaces, applications, or some other type of software. In this example, operating software 506 comprises software modules 507-510, although software 506 could have alternative configurations in other examples.

When executed by processing circuitry 504, operating software 506 directs processing system 502 to operate wireless communication device 500 as described herein for wireless communication device 100. In particular, operating software 506 directs processing system 502 to receive data indicating a plurality of commercial icons that are related to a plurality of commercial industries. Further, operating software 506 directs processing system 502 to direct user interface 503 to display an original group of commercial icons that are individually related to different ones of commercial industries. In addition, operating software 506 directs processing system 502 to direct user interface 503 to receive a first user input to scroll the display toward a first set of the commercial icons related to a first one of the commercial industries, and in response, display the first set of the commercial icons related to the first one of the commercial industries while displaying a portion of the original group of the commercial icons that are not related to the first one of the commercial industries. Finally, operating software 506 directs processing system 502 to direct user interface 503 to receive a second user input to scroll the display toward a second set of the commercial icons related to a second one of the commercial industries based on the displayed portion of the original group of the commercial icons, and in response, display the second set of the commercial icons related to the second one of the commercial industries while displaying another portion of the original group of the commercial icons that are not related to the second one of the commercial industries.

In this example, operating software 506 comprises a data receiver software module 507 that receives data indicating a plurality of commercial icons that are related to a plurality of commercial industries. Additionally, operating software 506 comprises a group display software module 508 that displays an original group of commercial icons that are individually related to different ones of commercial industries. Operating software 506 also comprises a first scroll input software module 509 that receives a first user input to scroll the display toward a first set of the commercial icons related to a first one of the commercial industries, and in response, displays the first set of the commercial icons related to the first one of the commercial industries while displaying a portion of the original group of the commercial icons that are not related to the first one of the commercial industries. Finally, operating software 506 comprises a second scroll input software module 510 that receives a second user input to scroll the display toward a second set of the commercial icons related to a second one of the commercial industries based on the displayed portion of the original group of the commercial icons, and in response, displays the second set of the commercial icons related to the second one of the commercial industries while displaying another portion of the original group of the commercial icons that are not related to the second one of the commercial industries.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device, the method comprising:
   receiving data indicating a plurality of commercial icons that are related to a plurality of commercial industries;
   on a display of the wireless communication device, displaying, in a plurality of rows with two or more of the commercial icons in each row, an original group of the commercial icons that are individually related to different ones of the commercial industries;
   receiving a first user input to scroll the display toward a first set of the commercial icons related to a first one of the commercial industries, wherein the first user input comprises a sliding touch;
   in response to the first user input, identifying one or more additional icons in the commercial icons related to the first one of the commercial industries, wherein the original group of the commercial icons does not comprise the one or more additional icons, and displaying the first set of the commercial icons related to the first one of the commercial industries and the one or more additional icons in the commercial icons related to the first one of the commercial industries while displaying a portion of the original group of the commercial icons that are not related to the first one of the commercial industries; and
   receiving a second user input to scroll the display toward a second set of the commercial icons related to a second one of the commercial industries based on the displayed portion of the original group of the commercial icons, wherein the second user input comprises a second sliding touch; and
   in response to the second user input, identifying one or more supplemental icons in the commercial icons related to the second one of the commercial industries, wherein the original group of the commercial icons does not comprise the one or more supplemental icons, and displaying the second set of the commercial icons related to the second one of the commercial industries and the one or more supplemental icons in the commercial icons related to the second one of the commercial industries while displaying another portion of the original group of the commercial icons that are not related to the second one of the commercial industries.

2. The method of claim 1 wherein displaying the original group of the commercial icons comprises oscillating a size of at least one of the commercial icons in the original group.

3. The method of claim 1 wherein displaying the first set of the commercial icons comprises oscillating a size of at least one of the commercial icons in the first set.

4. The method of claim 1 wherein displaying the second set of the commercial icons comprises oscillating a size of at least one of the commercial icons in the second set.

5. The method of claim 1 wherein the commercial industries comprise a food service industry.

6. The method of claim 1 wherein the commercial industries comprise a media service industry.

7. The method of claim 1 wherein the commercial industries comprise an apparel industry.

8. A wireless communication device comprising:
   a graphical user interface comprising a display;
   a wireless communication transceiver configured to receive data indicating a plurality of commercial icons that are related to a plurality of commercial industries;
   a processing system configured to direct the graphical user interface to display, in a plurality of rows with two or more of the commercial icons in each row, an original group of the commercial icons that are individually related to different ones of the commercial industries;
   the processing system configured to direct the graphical user interface to receive a first user input to scroll the display toward a first set of the commercial icons related to a first one of the commercial industries, wherein the first user input comprises a sliding touch;
   the processing system configured to, in response to the first user input, identify one or more additional icons in the commercial icons related to the first one of the commercial industries, wherein the original group of the commercial icons does not comprise the one or more additional icons, and display the first set of the commercial icons related to the first one of the commercial industries and the one or more additional icons in the commercial icons related to the first one of the commercial industries while displaying a portion of the original group of the commercial icons that are not related to the first one of the commercial industries; and
   the processing system configured to direct the graphical user interface to receive a second user input to scroll the display toward a second set of the commercial icons related to a second one of the commercial industries based on the displayed portion of the original group of the commercial icons wherein the second user input comprises a second sliding touch; and
   the processing system configured to, in response to the second user input, identify one or more supplemental icons in the commercial icons related to the second one of the commercial industries, wherein the original group of the commercial icons does not comprise the one or more supplemental icons, and display the second set of the commercial icons related to the second one of the commercial industries and the one or more supplemental icons in the commercial icons related to the second one of the commercial industries while displaying another portion of the original group of the commercial icons that are not related to the second one of the commercial industries.

9. The wireless communication device of claim 8 wherein the processing system configured to direct the graphical user interface to display the original group of the commercial icons comprises the processing system configured to direct the graphical user interface to oscillate a size of at least one of the commercial icons in the original group.

10. The wireless communication device of claim 8 wherein the processing system configured to direct the graphical user interface to display the first set of the commercial icons comprises the processing system configured to direct the graphical user interface to oscillate a size of at least one of the commercial icons in the first set.

11. The wireless communication device of claim 8 wherein the processing system configured to direct the graphical user interface to display the second set of the commercial icons comprises the processing system configured to direct the graphical user interface to oscillate a size of at least one of the commercial icons in the second set.

12. The wireless communication device of claim 8 wherein the commercial industries comprise a food service industry.

13. The wireless communication device of claim 8 wherein the commercial industries comprise a media service industry.

14. The wireless communication device of claim 8 wherein the commercial industries comprise an apparel industry.

15. A computer apparatus comprising:
software instructions configured, when executed by a wireless communication device, to direct the wireless communication device to receive data indicating a plurality of commercial icons that are related to a plurality of commercial industries, display, in a plurality of rows with two or more of the commercial icons in each row, an original group of the commercial icons on a display of the wireless communication device that are individually related to different ones of the commercial industries, receive a first user input to scroll the display toward a first set of the commercial icons related to a first one of the commercial industries, wherein the first user input comprises a sliding touch, in response to the first user input, identifying one or more additional icons in the commercial icons related to the first one of the commercial industries, wherein the original group of the commercial icons does not comprise the one or more additional icons, and display the first set of the commercial icons related to the first one of the commercial industries and the one or more additional icons in the commercial icons related to the first one of the commercial industries while displaying a portion of the original group of the commercial icons that are not related to the first one of the commercial industries, and receive a second user input to scroll the display toward a second set of the commercial icons related to a second one of the commercial industries based on the displayed portion of the original group of the commercial icons wherein the second user input comprises a second sliding touch, in response to the second user input, identify one or more supplemental icons in the commercial icons related to the second one or the commercial industries, wherein the original group of commercial icons does not comprise the one or more supplemental icons, and display the second set of the commercial icons related to the second one of the commercial industries and the one or more supplemental icons in the commercial icons related to the second one of the commercial industries while displaying another portion of the original group of the commercial icons that are not related to the second one of the commercial industries; and at least one non-transitory computer-readable storage medium storing the software instructions.

16. The computer apparatus of claim 15 wherein the software instructions configured to direct the wireless communication device to display the original group of the commercial icons comprises the software instructions configured to direct the wireless communication device to oscillate a size of at least one of the commercial icons in the original group.

17. The computer apparatus of claim 15 wherein the software instructions configured to direct the wireless communication device to display the first set of the commercial icons comprises the software instructions configured to direct the wireless communication device to oscillate a size of at least one of the commercial icons in the first set.

18. The computer apparatus of claim 15 wherein the software instructions configured to direct the wireless communication device to display the second set of the commercial icons comprises the software instructions configured to direct the wireless communication device to oscillate a size of at least one of the commercial icons in the second set.

19. The computer apparatus of claim 15 wherein the commercial industries comprise a food service industry.

20. The computer apparatus of claim 15 wherein the commercial industries comprise a media service industry.

* * * * *